(12) United States Patent
Tsirkin

(10) Patent No.: US 9,529,835 B2
(45) Date of Patent: Dec. 27, 2016

(54) ONLINE COMPRESSION FOR LIMITED SEQUENCE LENGTH RADIX TREE

(71) Applicant: Red Hat Israel, Ltd., Ra'anana (IL)

(72) Inventor: Michael Tsirkin, Ra'anana (IL)

(73) Assignee: RED HAT ISRAEL, LTD., Ra'anana (IL)

( * ) Notice: Subject to any disclaimer, the term of this patent is extended or adjusted under 35 U.S.C. 154(b) by 295 days.

(21) Appl. No.: 14/194,553

(22) Filed: Feb. 28, 2014

(65) Prior Publication Data

US 2015/0248449 A1 Sep. 3, 2015

(51) Int. Cl.
*G06F 17/30* (2006.01)
(52) U.S. Cl.
CPC ... *G06F 17/30327* (2013.01); *G06F 17/30961* (2013.01)
(58) Field of Classification Search
CPC .............. G06F 17/30327; G06F 17/30961
USPC ........................................................ 707/693
See application file for complete search history.

(56) References Cited

U.S. PATENT DOCUMENTS

2009/0077076 A1* 3/2009 Berger .............. G06F 17/30327
707/999.003

OTHER PUBLICATIONS

Radix Tree, Wikipedia, the free encyclopedia, retrieved on Apr. 24, 2014 from http://en.wikipedia.orq/wiki/Radix_tree, pp. 1-7.
Trees I: Radix Trees, [LWN.net], retrieved on Apr. 24, 2014 from http://lwn.net/Articles/175432/, pp. 1-3, Copyright © 2006, Eklektix, Inc.

* cited by examiner

*Primary Examiner* — Hosain Alam
*Assistant Examiner* — Tracy McGhee
(74) *Attorney, Agent, or Firm* — Haynes and Boone, LLP

(57) ABSTRACT

Systems and methods are disclosed for inserting a key into a radix tree. In an example method, inserting a key into the radix tree includes comparing a first key including a first sequence of elements with a second key including a second sequence of elements. The method includes identifying a common prefix in the first and second keys and identifying a remainder sequence in the second key. The remainder sequence is a suffix after the common prefix in the second sequence of elements. The method also includes splitting the remainder sequence into a plurality of chunks. Each chunk includes a sequence of elements in the remainder sequence. The method further includes for each chunk, locating a parent container from which to insert a child container into the radix tree, creating a new container including the respective chunk, and inserting the new container as a child container of the parent container.

35 Claims, 11 Drawing Sheets

ONLINE COMPRESSION FOR LIMITED SEQUENCE LENGTH RADIX TREE

BACKGROUND

The present disclosure generally relates to a radix tree, and more particularly to maintaining a compressed radix tree.

A radix tree is a data structure that is used to store data. A radix tree may be useful for constructing associative arrays with keys that can be expressed as strings. In a conventional radix tree, the string at each node is compared chunk by chunk, where the quantity of bits in that chunk at that node is the radix r of the radix tree. A radix tree typically supports insertion, deletion, and search operations. The insertion operation adds a new string to the radix tree while trying to minimize the amount of data stored. The deletion operation removes a string from the radix tree. A search operation may include an exact lookup of a string, a lookup of a predecessor or successor of the string, or a lookup of all strings with a particular prefix.

BRIEF SUMMARY

This disclosure relates to maintaining a compressed radix tree. Methods, systems, and techniques for inserting a key into a radix tree are provided.

According to an embodiment, a method of inserting a key into a radix tree includes comparing a first key including a first sequence of elements with a second key including a second sequence of elements. A radix tree stores the first key, and a traversal of a first set of containers in the radix tree identifies the first sequence of elements. The method further includes identifying, based on the comparing, a common prefix in the first and second keys. The method also includes identifying, based on the comparing, a remainder sequence in the second key. The remainder sequence is a suffix after the common prefix in the second sequence of elements. The method further includes splitting the remainder sequence into a plurality of chunks. Each chunk includes a sequence of elements in the remainder sequence. The method also includes inserting the second key into the radix tree, where inserting the second key into the radix tree includes for each chunk, locating a parent container from which to insert a child container into the radix tree, creating a new container including the respective chunk, and inserting the new container as a child of the parent container.

According to another embodiment, a system for inserting a key into a radix tree includes a splitter that compares a first key including a first sequence of elements with a second key including a second sequence of elements. The splitter identifies a common prefix in the first and second keys, identifies a remainder sequence in the second key, and splits the remainder sequence into a plurality of chunks. The first key is stored in a radix tree and a traversal of a first set of containers in the radix tree identifies the first sequence of elements. The remainder sequence is a suffix after the common prefix in the second sequence of elements, and each chunk includes a sequence of elements in the remainder sequence. The system also includes a container generator that for each chunk of the plurality of chunks creates a container including the respective chunk. The system further includes a container inserter that inserts the second key into the radix tree. For each chunk the container inserter locates a parent container from which to insert a child container into the radix tree and inserts the container including the respective chunk as a child container of the parent container.

According to another embodiment, a non-transitory machine-readable medium includes a plurality of machine-readable instructions that when executed by one or more processors are adapted to cause the one or more processors to perform a method including: comparing a first key including a first sequence of elements with a second key including a second sequence of elements, a radix tree storing the first key, and a traversal of a first set of containers in the radix tree identifying the first sequence of elements; identifying, based on the comparing, a common prefix in the first and second keys; identifying, based on the comparing, a remainder sequence in the second key, the remainder sequence being a suffix after the common prefix in the second sequence of elements; splitting the remainder sequence into a plurality of chunks, each chunk including a sequence of elements in the remainder sequence; and inserting the second key into the radix tree, where the inserting the second key includes for each chunk: locating a parent container from which to insert a child container into the radix tree; creating a new container including the respective chunk; and inserting the new container as a child container of the parent container.

Methods, systems, and techniques for removing a key from a radix tree are provided. According to an embodiment, a method of removing a key from a radix tree including one or more containers includes receiving an instruction to remove a key from a radix tree. The key includes a sequence of elements. The method also includes identifying a first set of containers in the radix tree. The first set of containers stores the key, and each container of the first set of containers includes a chunk of the sequence of elements. The method further includes removing the key from the radix tree. Removing the key from the radix tree includes traversing the first set of containers. The method also includes for each traversed container of the first set of containers, determining whether the traversed container has a child container and when the traversed container is determined to not have a child container, removing the traversed container from the radix tree. The method also includes combining a second set of containers in the radix tree into a single container. The second set of containers includes one or more containers in the radix tree after removing the key from the radix tree.

According to another embodiment, a system for removing a key from a radix tree including one or more containers includes a remover that receives an instruction to remove a key from a radix tree. The remover identifies a first set of containers in the radix tree and removes the key from the radix tree. The key includes a sequence of elements, the first set of containers stores the key, and each container of the first set of containers includes a chunk of the sequence of elements. The system also includes a traverser that traverses the first set of containers. For each traversed container of the first set of containers the remover determines whether the traversed container has a child container. When the traversed container is determined to not have a child container, the remover removes the traversed container from the radix tree. The system further includes a combiner that combines a second set of containers in the radix tree into a single container. The second set of containers includes one or more containers in the radix tree after the remover removes the key.

According to another embodiment, a non-transitory machine-readable medium includes a plurality of machine-readable instructions that when executed by one or more processors are adapted to cause the one or more processors to perform a method including: receiving an instruction to remove a key from a radix tree, the key including a sequence of elements; identifying a first set of containers in the radix tree, the first set of containers storing the key, and each container of the first set of containers including a chunk of the sequence of elements; removing the key from the radix tree, where the removing includes traversing the first set of containers. For each traversed container of the first set of containers, the method further includes: determining whether the traversed container has a child container; and when the traversed container is determined to not have a child container, removing the traversed container from the radix tree. The method also includes combining a second set of containers in the radix tree into a single container, the second set of containers including one or more containers in the radix tree after the key is removed.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

Figure 1:
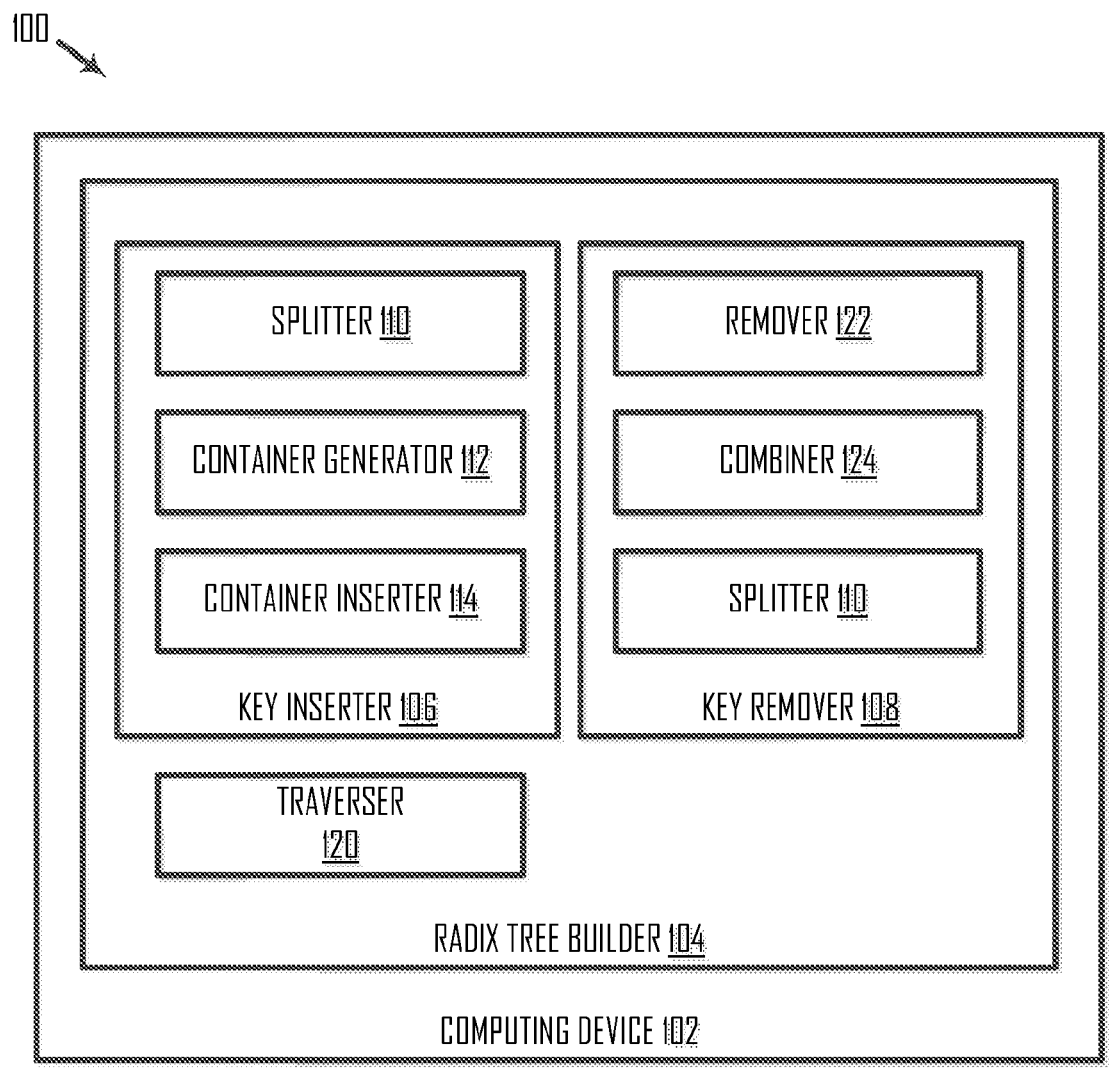
FIG. 1 is a block diagram illustrating a system for performing one or more operations on a radix tree, according to an embodiment.

Embodiments of the present disclosure and their advantages are best understood by referring to the detailed description that follows. It should be appreciated that like reference numerals are used to identify like elements illustrated in one or more of the figures. The drawing in which an element first appears is generally indicated by the left-most digit in the corresponding reference number.

DETAILED DESCRIPTION

I. Overview
II. Example System Architecture
  A. Create the Radix Tree
  B. Insert a Key into an Existing Radix Tree
    1. Identify a Common Prefix
    2. Split the Remainder Sequence
  C. Remove a Key From the Radix Tree
    1. Remove the Key
    2. Combine One or More Containers in the Radix Tree
III. Example Methods
IV. Example Computing System
I. Overview It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

A binary tree may store one or more keys. In an example, if the binary tree stores a key that starts with 100 "0"s, the binary tree may have a depth of 100, stretching down to 100 levels. After the first 100 levels, the path may branch out. It may be time consuming to traverse the binary tree following a single path for 100 levels. A radix tree may offer advantages over a binary tree. For example, rather than store a single bit in a container a radix tree may store a sequence of elements in a single container.

Keys stored in the radix tree may have different lengths. To implement such a radix tree, memory to store the radix tree may be dynamically allocated or may be pre-allocated to ensure that sufficient memory is available to store the longest possible key for each container. Dynamically allocating memory and pre-allocating memory for a radix tree may have performance issues.

It may be desirable to compress a radix tree storing one or more keys. The disclosure provides techniques to maintain a compressed radix tree.

II. Example System Architecture

FIG. 1 is a block diagram 100 illustrating a system for performing one or more operations on a radix tree, according to an embodiment. Diagram 100 includes a computing device 102 that includes a radix tree builder 104. Computing device 102 may be a workstation, computer, server, game console, set-top box, kiosk, embedded system, mobile device (e.g., a mobile phone, personal digital assistant, tablet, and laptop), or other device having at least one processor and memory. Radix tree builder 104 is executable on computing device 102 and builds and performs operations on a radix tree.

Radix tree builder 104 includes a key inserter 106, a key remover 108, and a traverser 120. Key inserter 106 inserts one or more keys into a radix tree, and includes a splitter 110, container generator 112, and container inserter 114. Key remover 108 removes one or more keys from a radix tree, and includes remover 122, combiner 124, and splitter 110. Traverser 120 traverses the radix tree container by container and may identify a sequence of elements included in a container. A radix tree may include one or more containers, and a container may be a node or an edge of the radix tree.

A key includes a sequence of elements. An element may be, for example, a symbol, character, letter, number, or bit. Other elements are within the scope of the disclosure. The key may map to a value that is referenced by a leaf container in the radix tree. In an example, a key is a sequence of bits that represents an address in memory. In such an example, the key may represent an address supplied in an instruction (e.g., input/output (I/O) address for a port I/O or a physical memory address for memory I/O) that maps to a "target" that indicates the instruction type. In another example, a key is a word including a sequence of letters. In such an example, the radix tree may be used to index words in a text document.

A. Create the Radix Tree

Figure 2A:
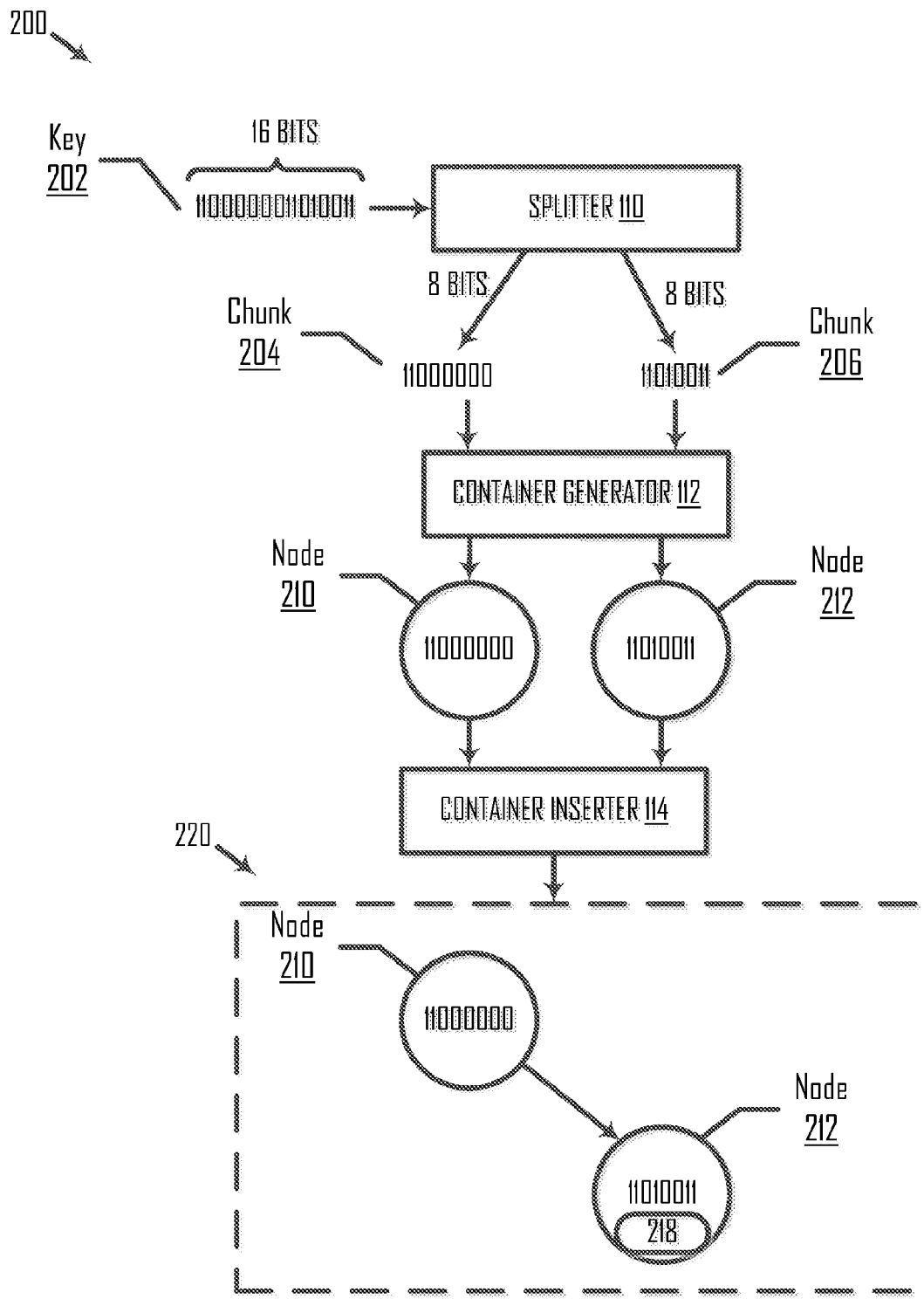
FIG. 2A-2D are diagrams of keys being inserted into a radix tree, according to an embodiment.

Radix tree builder 104 may receive an instruction to insert a key into a radix tree. If the radix tree does not exist yet, key inserter 106 may create the radix tree by creating one or more containers that form the radix tree. FIG. 2A-2D are diagrams of keys being inserted into a radix tree, according to an embodiment. FIG. 2A is a block diagram 200 illustrating a key 202 being inserted into a radix tree, according to an embodiment. In an example, key inserter 106 receives an instruction to insert key 202, which includes a sequence of 16 bits "1100000011010011", into a radix tree.

Splitter 110 determines whether a length of key 202 satisfies a threshold. In an example, the length of key 202 satisfies the threshold if the length of key 202 exceeds the threshold. When splitter 110 determines that the length of key 202 satisfies the threshold, splitter 110 may process key 202 by splitting key 202 into a plurality of chunks, where a length of each of the chunks does not exceed the threshold. For example, splitter 110 may split key 202 into chunks based on the threshold such that a length of each chunk is equal to or smaller than the threshold. In an example, the threshold is eight, and splitter 110 obtains key 202 and splits it into chunks 204 and 206. Splitter 110 may determine the chunks by selecting a subset of the elements in key 202 and keeping the selected subset of elements in sequential order as they are "chunked." For example, chunk 204 includes a first sequence of elements "11000000", which is the first eight bits of key 202, and chunk 206 includes a second sequence of elements "11010011", which includes the next eight bits of key 202 after the first sequence of elements. The last element in chunk 204 is adjacent to the first element in chunk 206. As such, the initial sequence of elements included in key 202 may be determined by placing chunk 204 next to chunk 206, which provides "1100000011010011".

It should be understood that the threshold may be greater than eight, and the splitter 110 may still split key 202 into two chunks of eight. As discussed, splitter 110 splits up a key into a plurality of chunks such that a length of each chunk does not exceed the threshold. In another example, splitter 110 may split key 202 into four chunks, each having a length of four. In another example, splitter 110 may split key 202 into three chunks, where the first chunk includes the first five bits ("11000"), the second chunk includes the next five bits ("00011") after the first chunk, and the third chunk includes the remaining six bits ("010011") after the second chunk. Accordingly, chunks may be of different lengths from each other.

In an embodiment, for each chunk of the plurality of chunks container generator 112 creates a container including the respective chunk. Accordingly, each container in the radix tree may store a sequence of elements of a limited length. Although the disclosure may describe a container as storing a sequence of elements, it should also be understood that the sequence of elements may be maintained in an edge that is attached to the container. To encompass these embodiments, the disclosure may describe the container as including the sequence of elements. In FIG. 2A, container generator 112 creates a container 210 including chunk 204 and creates a container 212 including chunk 206. Container generator 112 may create the container and store a chunk in the container.

Container inserter 114 determines whether the radix tree has been built yet. In the example illustrated in FIG. 2A, the radix tree has not yet been built. If the radix tree has not yet been built, container inserter 114 identifies the container having the beginning elements of key 202 and makes this the root container of the radix tree. In FIG. 2A, container inserter 114 identifies container 210 as the container storing the beginning elements of key 202 and makes this the root container of a radix tree 220. Container 210 includes the first eight bits of key 202. Container inserter 114 inserts containers into the radix tree and determines which container is a child of another container based on an order of the chunks included in the containers. Container inserter 114 identifies the root container as the parent container and finds the next container having the next sequence of bits after the chunk in the identified parent container and inserts this next container as a child container of the identified parent container. Container inserter 114 may then identify the child container as the parent container, and identify the next container to insert as a child container of the newly identified parent container.

In the example illustrated in FIG. 2, container inserter 114 identifies container 212 as the next container including the next chunk of key 202 after the chunk included in the parent container and inserts container 212 as a child of container 210. Container inserter 114 then identifies this newly inserted container as the parent container and continues to insert containers storing chunks of key 202 until they have all been inserted into the radix tree. In FIG. 2A, after container inserter 114 inserts container 212, container inserter 114 has finished inserting the containers including chunks of key 202 and produces radix tree 220. Accordingly, a traversal of a set of containers including inserted containers 210 and 212 in radix tree 220 identifies the sequence of elements included in key 202.

When a lookup for key 202 occurs, traverser 120 may traverse radix tree 210 to search for key 202. In an example, traverser 120 starts from the root container of radix tree 220, container 210, which stores the first eight bits of the key that is being searched for. Traverser 120 then looks at container 210's children to search for the next sequence of elements in the searched for key after the sequence of elements included in container 210. Traverser 120 identifies container 212, a child of container 210, as including the next sequence of elements in key 202 and has thus found key 202 "1100000011010011". Container 212 is a leaf container because it has no children. A leaf container may be associated with a value to which the key is mapped. In an embodiment, container inserter 114 identifies a value 218 as being a value to which key 202 maps and associates value 218 with key 202. In an example, container inserter 114 inserts value 218 into container 212. In another example, container inserter 114 stores in container 212 a pointer to value 218. Traverser 120 may then look in the leaf container to identify a value to which the key maps.

In the above example, splitter 110 determined that the length of key 202 satisfied the threshold. If splitter 110 determines that the length of a key does not satisfy the threshold (e.g., the length of the key is equal to or smaller than the threshold), splitter 110 may decide to not split the key into chunks and container generator 112 may create one container that includes the key. Container inserter 114 may then insert this container into the radix tree. In an example, if splitter 110 receives the key "00" to insert into a radix tree that has not yet been created, container generator 112 may generate a container that includes "00" and container inserter 114 may create a radix tree having only one container that includes the key "00".

B. Insert a Key into an Existing Radix Tree

Figure 2B:
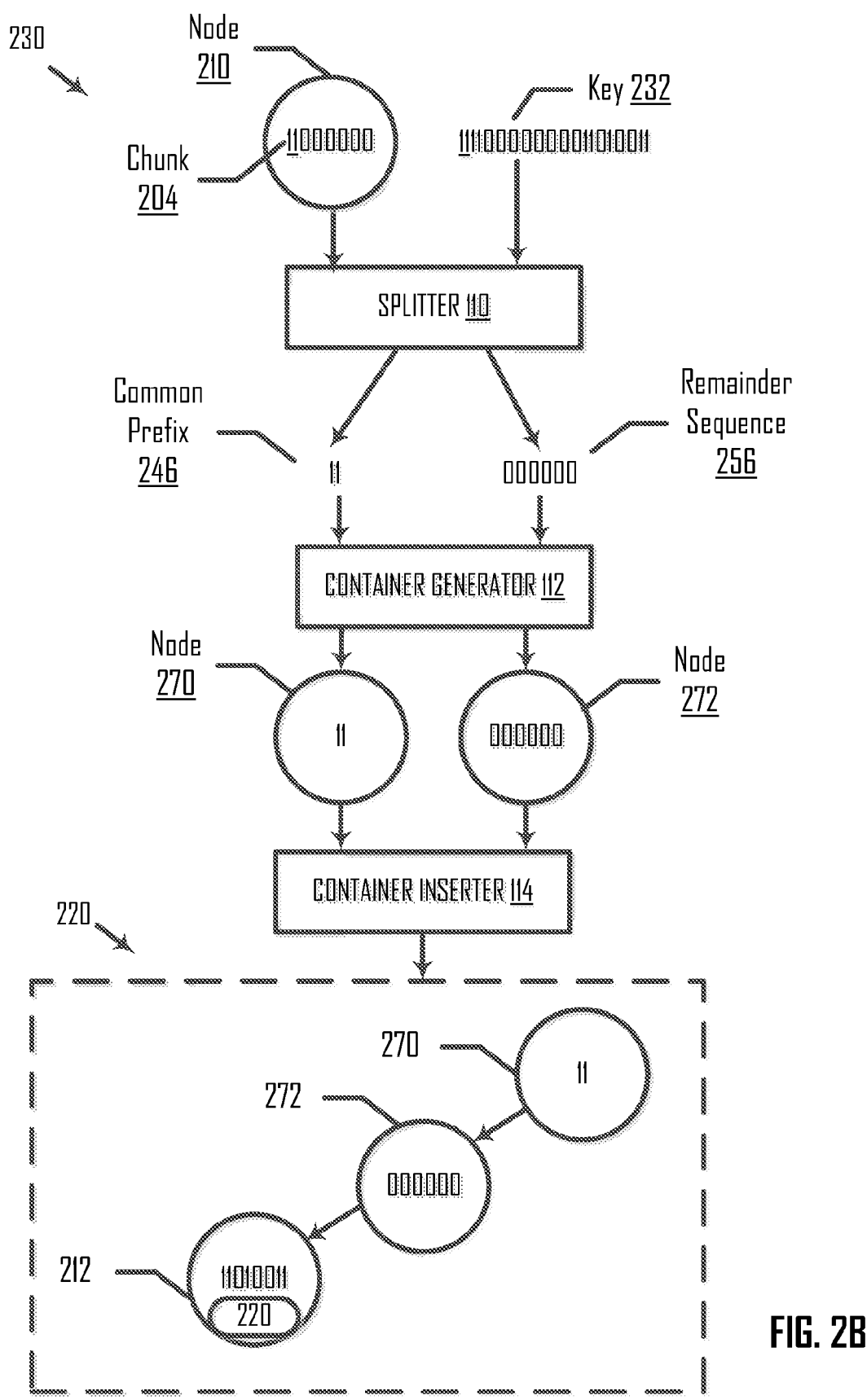
Figure 2C:
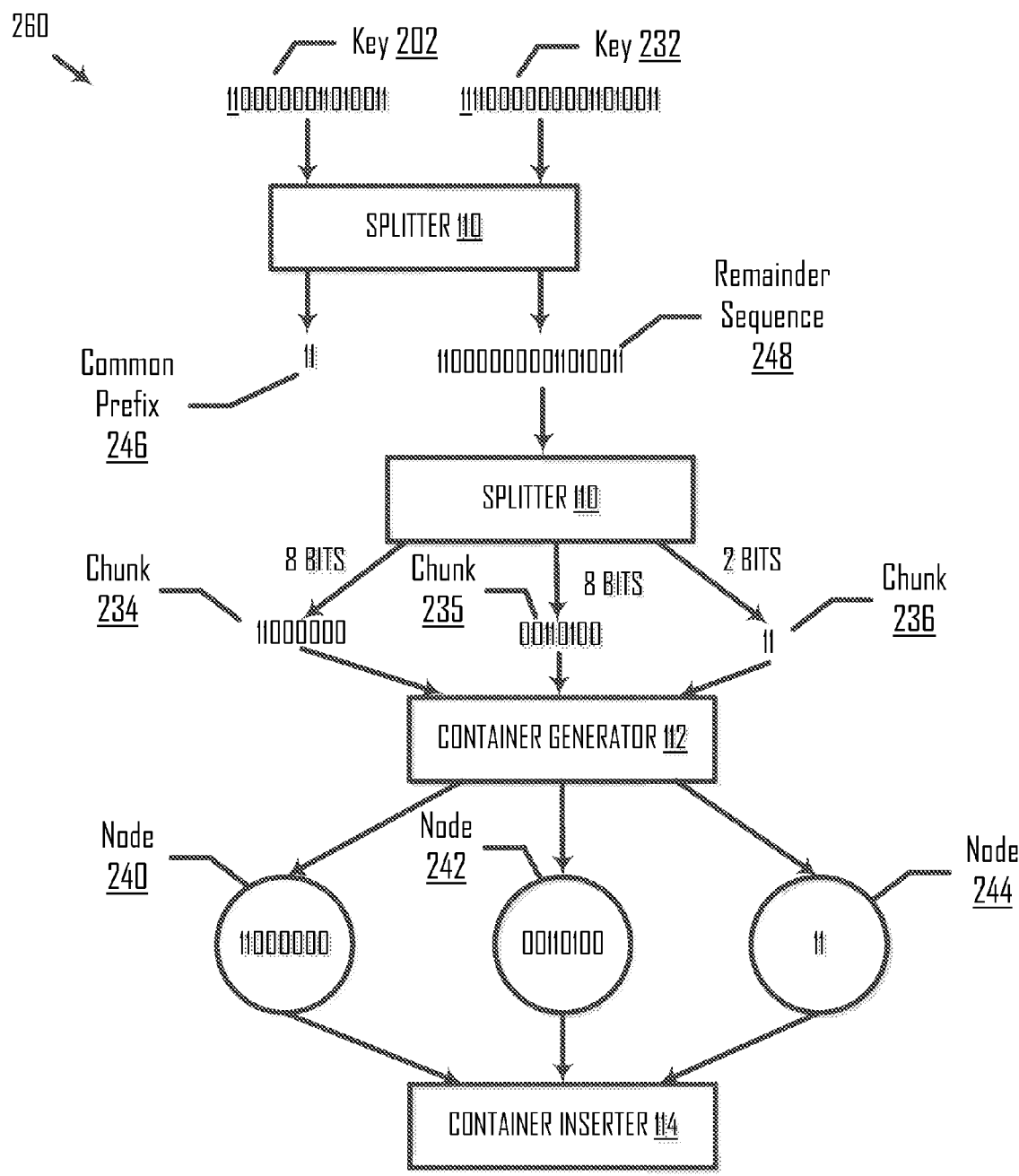
Figure 2D:
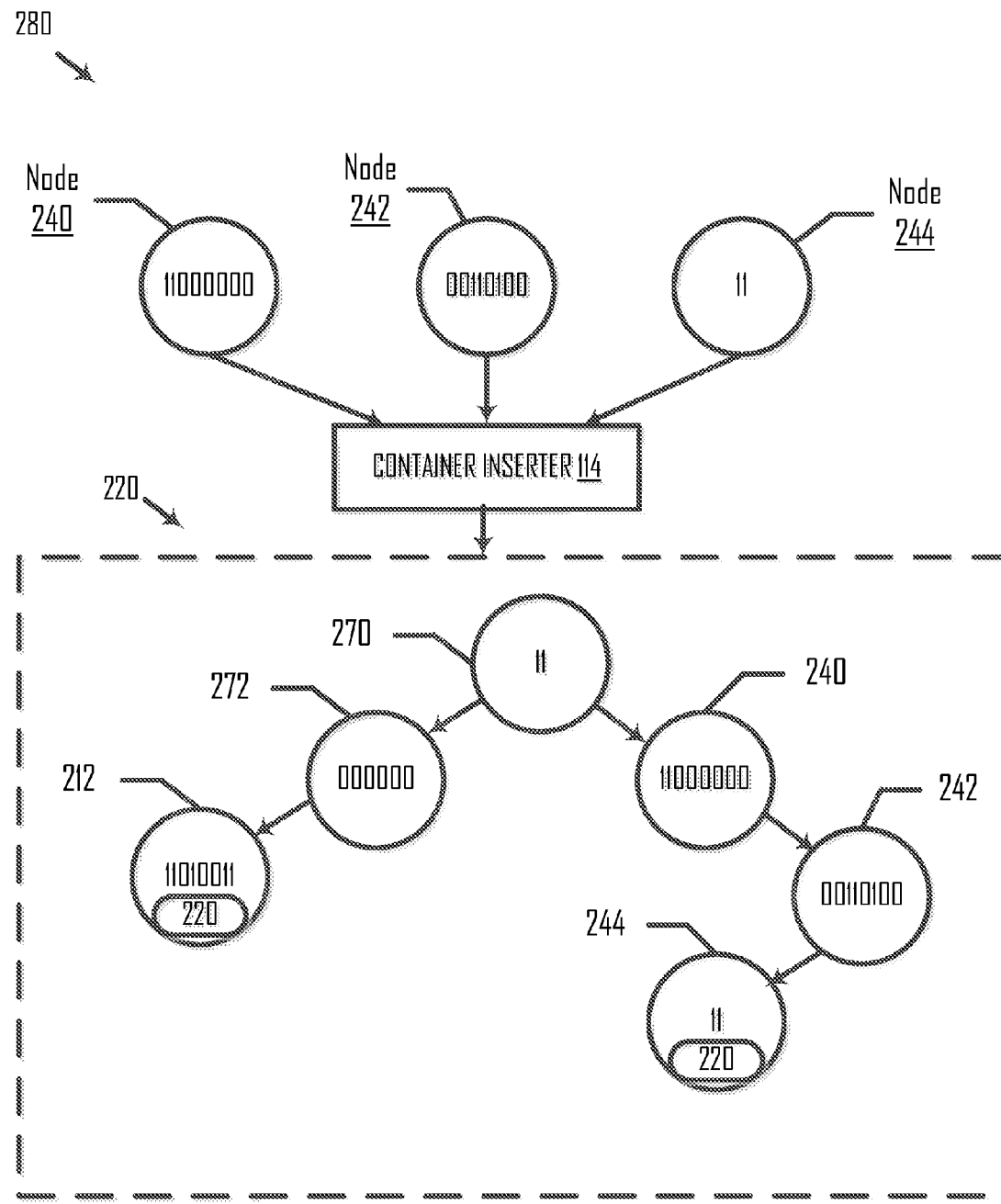

Radix tree builder 104 may receive an instruction to insert a key into an existing radix tree. FIGS. 2B-2D are block diagrams 230, 260, 290 illustrating a key 232 being inserted into radix tree 220, according to an embodiment. FIG. 2B illustrates a rearrangement of the containers in radix tree 220 before key 232 is inserted, according to an embodiment. Radix tree 220 in FIG. 2B is an intermediate radix tree. In FIG. 2B, key inserter 106 receives an instruction to insert key 232, which includes a sequence of 20 bits "11110000000011010011", into radix tree 220. In keeping with the example illustrated in FIG. 2A, radix tree 204 has already been built. In such an example, container inserter 114 may identify radix tree 204 as being the radix tree in which to insert key 232. Key inserter 106 updates the radix tree "online" such that key inserter 106 updates the radix tree as new keys are added to the radix tree. Key inserter 106 inserts key 232 into radix tree 220 using a technique that overcomes conventional radix tree insertion operations. For example, key inserter 106 may leverage the fact that the key to be inserted into radix tree 220 has a commonality among the key(s) already stored in the radix tree to produce a compressed radix tree.

I. Identify a Common Prefix

In an embodiment, traverser 120 traverses radix tree 220 until a prefix that is common to key 232 and a sequence of elements included in a container in the radix tree is found, or until all containers in the radix tree have been searched and no common prefix is found. Referring back to FIG. 2A, traverser 120 identifies, based on traversing radix tree 220, container 210 including chunk 204, which includes the sequence of bits "11000000". In FIG. 2B chunk 204 and key 232 include a common prefix 246, as indicated by the underlined prefix "11" included in chunk 204 stored in container 210 and also included in key 232. Splitter 110 may obtain chunk 204 and split it into a second plurality of chunks, where the second plurality of chunks includes common prefix 246 and a remainder sequence 256. Remainder sequence 256 includes the remaining sequence of elements in chunk 204 after common prefix 246.

2. Split the Remainder Sequence

Splitter 110 may determine whether to split remainder sequence 256 into a third plurality of chunks. In an example, if a length of remainder sequence 256 satisfies the threshold (e.g., exceeds the threshold), splitter 110 determines to split remainder sequence 256 into the third plurality of chunks. In FIG. 2B, the length of remainder sequence 256 is six because it has six elements, and six is smaller than eight. Thus, splitter 110 determines to not split remainder sequence 256 into a third plurality of chunks. In another example, if splitter 110 determines to split remainder sequence 256 into a third plurality of chunks, splitter 110 may split remainder sequence 256 into the third plurality of chunks as described in the present disclosure.

For each chunk of the second and third plurality of chunks, container generator 112 creates a container including the respective chunk. In FIG. 2B, container generator 112 creates a prefix container 270 including common prefix 246 and creates a container 272 including remainder sequence 256. Containers 270 and 272 are containers created based on the second and third plurality of chunks.

Container inserter 114 replaces the identified parent container, container 210, with containers 270 and 272, which include the elements stored in container 210. Container inserter 114 inserts containers 270 and 272 into radix tree 220 such that the container including the beginning elements is a parent to a container including the next sequence of bits, which is a parent of a container including the next sequence of bits, and so on until the containers created based on the second and third plurality of chunks are all inserted into radix tree 220. In an embodiment, container inserter 114 locates prefix container 270 including common prefix 246 and identifies a next container in the second and third plurality of chunks, where the next container includes a chunk that is after common prefix 246 based on an order of the sequence of elements in container 210. Container inserter 114 may insert the next container as a child of the parent container. Container inserter 114 may then identify the recently inserted child container as the parent container and continually insert child containers until all of the containers created based on splitting chunk 204 are inserted into the radix tree. In FIG. 2B, radix tree 220 includes a root container that is container 270, which is a parent of container 272, which is a parent of container 212. If traverser 120 walks this path from container 270 to container 212, traverser 120 identifies key 202.

FIG. 2B illustrates an intermediate radix tree that has its containers rearranged in order to produce a compressed radix tree that stores key 232. FIG. 2C illustrates the containers that are created and inserted into radix tree 220 based on the insertion of key 232, according to an embodiment. In an embodiment, splitter 110 compares key 202 with key 232 and identifies, based on the comparison, a common prefix 246 (underlined elements "11") in keys 202 and 232. In FIG. 2C, splitter 110 determines that common prefix 246 is included in both keys 202 and 232, and may leverage the fact that common prefix 246 is already stored in radix tree 220. Splitter 110 identifies, based on the comparison, a remainder sequence 248 in key 232, where remainder sequence 248 is a suffix after common prefix 246 in the sequence of elements included in key 232. Common prefix 246 includes the sequence of elements "11", and remainder sequence 248 includes the sequence of elements "110000000011010011".

In keeping with the above example, splitter 110 determines whether a length of remainder sequence 248 is greater than eight, the threshold. If splitter 110 determines that the length of remainder sequence 248 is greater than eight, splitter 110 processes remainder sequence 248 by splitting it into a plurality of chunks. Remainder sequence 248 includes 18 elements and is thus bigger than either. Accordingly, splitter 110 splits remainder sequence 248 into a plurality of chunks. In FIG. 2C, splitter 110 splits remainder sequence 248 into chunks 234, 235, and 236, and each chunk of the plurality of chunks includes a sequence of elements in remainder sequence 248. Chunk 234 includes the sequence of elements "11000000", which is the first eight bits of remainder sequence 248, chunk 235 includes the sequence of elements "00110100", which includes the next eight bits of remainder sequence 248 after chunk 234, and chunk 236 includes the sequence of elements "11", which includes the remaining bits of remainder sequence 248 after chunk 235.

Container generator 112 creates a container for each of the chunks. In FIG. 2C, container generator 112 creates a container 240 including chunk "11000000" 234, creates a container 242 including chunk "00110100" 235, and creates a container 244 including chunk "11" 236.

FIG. 2D is a block diagram 280 illustrating a radix tree storing keys 202 and 232, according to an embodiment. Container inserter 114 inserts containers 240, 242, and 244 into radix tree 220. In an embodiment, container inserter 114 inserts key 232 into radix tree 220 by locating a parent container from which to insert container 240, which includes the beginning chunk of remainder sequence 248. Container inserter 114 locates the parent container by identifying a container that includes common prefix 246, which is stored in container 270. Accordingly, container inserter 114 identifies container 270 as the parent container from which to insert container 240 as a child and inserts container 240 as a child of container 270. Container inserter 114 then identifies container 242 as storing the next chunk of key 232 after the chunk stored in container 240 and inserts container 242 as a child of container 240. Container inserter 114 continues to do this until all of containers 240, 242, and 244 are inserted into radix tree 220.

In FIG. 2D, a traversal of container 270 and inserted containers 240, 242, and 244 in radix tree 220 identifies the second sequence of elements in key 232. Radix tree 220 has a depth of four, and when traverser 120 traverses radix tree 220 traverser 120 will go down at most a depth of four. If key inserter 106 receives another instruction to insert a key, key inserter 106 may insert the key as described in the disclosure.

It should be understood that splitter 110 may split up a sequence of elements into chunks that are of different lengths, and container generator 112 may generate containers that store chunks of different lengths. Splitter 110 may split a sequence of elements into a plurality of chunks by dividing the length of the sequence of elements by the threshold. In an example, if the length of the sequence of elements does not divide equally by the threshold such that there is a remainder, splitter 110 may generate chunks starting from the beginning of the sequence and having a length equal to the threshold. The last chunk may include the last element(s) of the sequence and have a smallest length compared to the other chunks. The length of the last chunk is equal to the remainder. In such an example, if the threshold is eight, splitter 110 may split key 232, "111100000000011010011", into three chunks, where the first chunk is "11110000", the second chunk is "00001101", and the third chunk is "0011". The first two chunks each have a length of eight, and the last chunk has a length of four. When container inserter 114 inserts containers including chunks produced in this fashion, the containers at the bottom of the radix tree may include fewer elements compared to containers at the top of the radix tree, which may lead to faster lookups of keys that are not stored in the radix tree.

In another example, if the length of the sequence of elements does not divide equally by the threshold such that there is a remainder, splitter 110 may generate chunks starting from the beginning of the sequence such that the first chunk has a length equal to the remainder and the remaining chunks have a length equal to the threshold. The first chunk may include the first element(s) of the sequence and have a smallest length compared to the other chunks. In such an example, if the threshold is eight, splitter 110 may split key 232, "111100000000011010011", into three chunks, where the first chunk is "1111", the second chunk is "00000000", and the third chunk is "11010011". The first chunk has a length of four, and the remaining chunks each have a length of eight. When container inserter 114 inserts containers including chunks produced in this fashion, the containers at the top of the radix tree may include fewer elements compared to containers at the top of the radix tree, which may lead to faster lookups of keys that are stored in the radix tree and may prove beneficial if more keys are added to the radix tree.

In an example, if the length of the sequence of elements does not divide equally by the threshold such that there is a remainder, splitter 110 may determine a number that is smaller than the threshold and divides equally into the length of the sequence of elements such that there is no remainder. Splitter 110 may then generate chunks starting from the beginning of the sequence such that a length of each chunk has a length equal to the number. In such an example, if the threshold is eight, splitter 110 may split key 232, "111100000000011010011", into four chunks, where the first chunk is "11110", the second chunk is "00000", the third chunk is "00110", and the fourth chunk is "10011". Each of the chunks has a length of five. Splitter 110 may alternate between different ways to split a sequence of elements.

In an embodiment, splitter 110 determines whether a length of the remainder sequence divides equally into the threshold. When the length of the remainder sequence is determined to not divide equally into the threshold, splitter 110 may determine a remainder based on dividing the length of the remainder sequence by the threshold. In an example, a length of the first chunk including the first element of the remainder sequence is equal to the remainder. In another example, a length of the last chunk including the last element of the remainder sequence is equal to the remainder.

In an embodiment, splitter 110 determines a remainder R based on dividing a length of the remainder sequence by the threshold, determines a quotient based on dividing the length of the remainder sequence by the threshold, and increments the quotient. Splitter 110 may split the remainder sequence into R chunks and N chunks, where each of the R chunks has a length equal to the incremented quotient, each of the N chunks has a length equal to the quotient, and R and N are whole numbers greater than or equal to zero. In an example, the R chunks include the beginning R chunks in the remainder sequence. In another example, the R chunks include the last R chunks in the remainder sequence.

C. Remove a Key From the Radix Tree

Figure 3A:
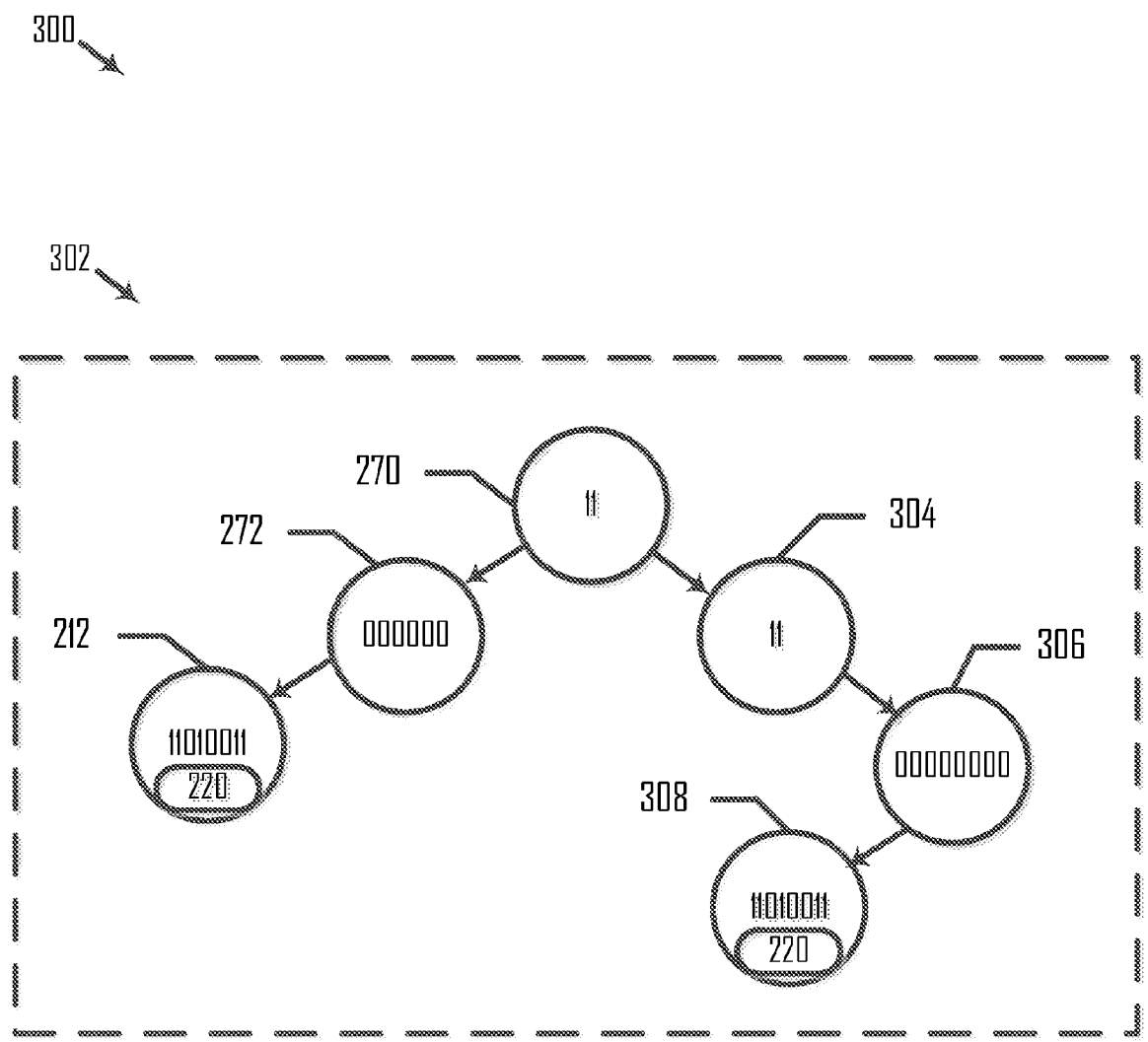
FIG. 3A is a block diagram illustrating a radix tree that stores two keys, according to an embodiment.

FIG. 3A is a block diagram 300 illustrating a radix tree 302 that stores keys 202 and 232, according to an embodiment. Key 202 includes "1100000011010011" and is stored in containers 270, 272, and 212. Container 270 includes "11", container 272 includes "000000", and container 212 includes "11010011". Key 232 includes "111100000000011010011" and is stored in containers 270, 304, 306, and 308. Container 270 includes "11", container 304 includes "11", container 306 includes "00000000", and container 308 includes "11010011".

I. Remove the Key

Referring back to FIG. 1, key remover 108 includes a remover 122, combiner 124, and splitter 110. In an example, remover 122 receives an instruction to remove a given key, key 202, from radix tree 302. Remover 122 identifies a set of containers that stores the sequence of elements included in key 202. In an example, remover 122 removes key 202 from radix tree 302 in FIG. 3A, and identifies containers 270, 272, and 212 as the set of containers storing the sequence of elements included in key 202.

Figure 3B:
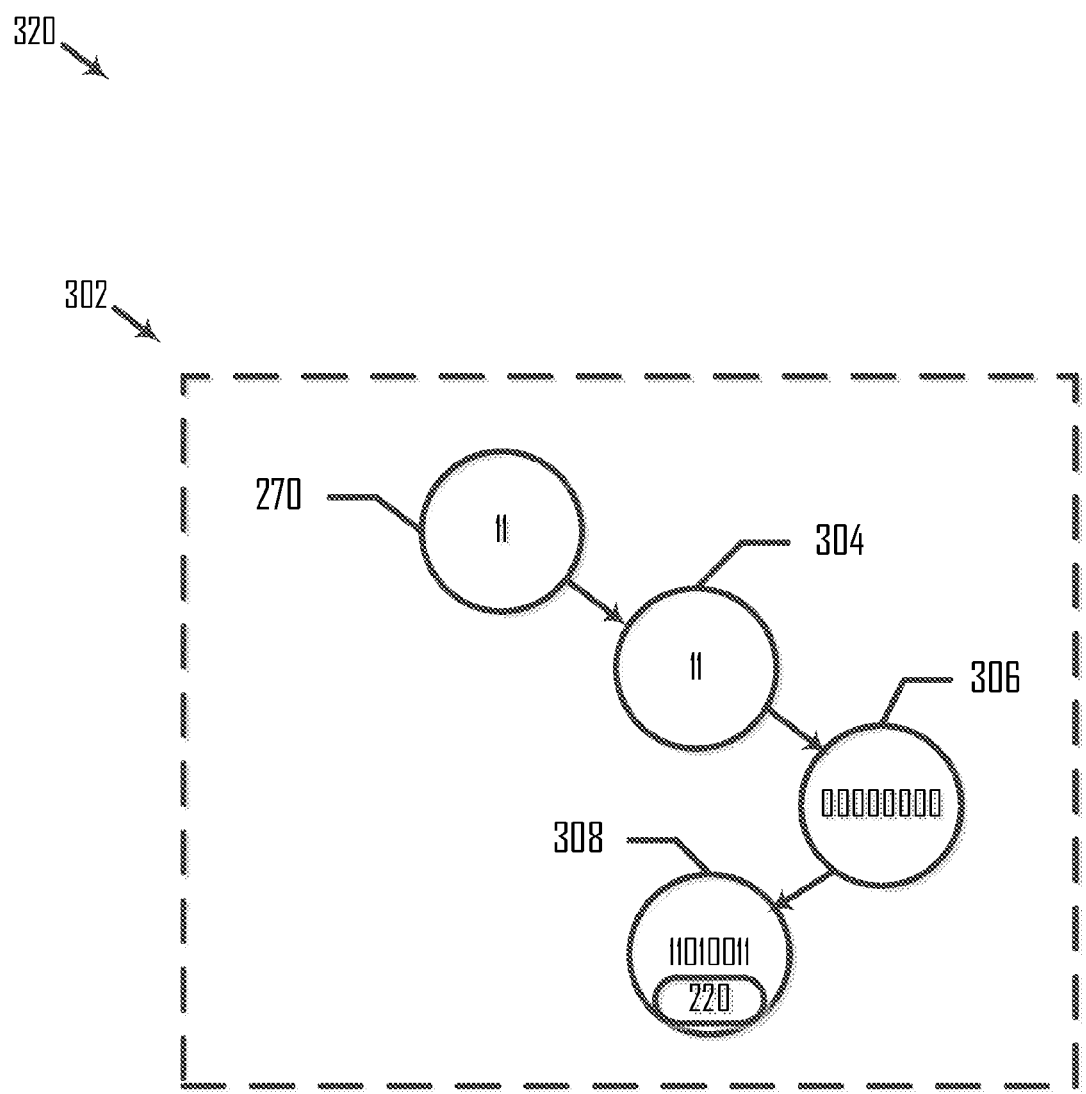
FIG. 3B-3C are diagrams of a key being removed from the radix tree, according to an embodiment.
Figure 3C:
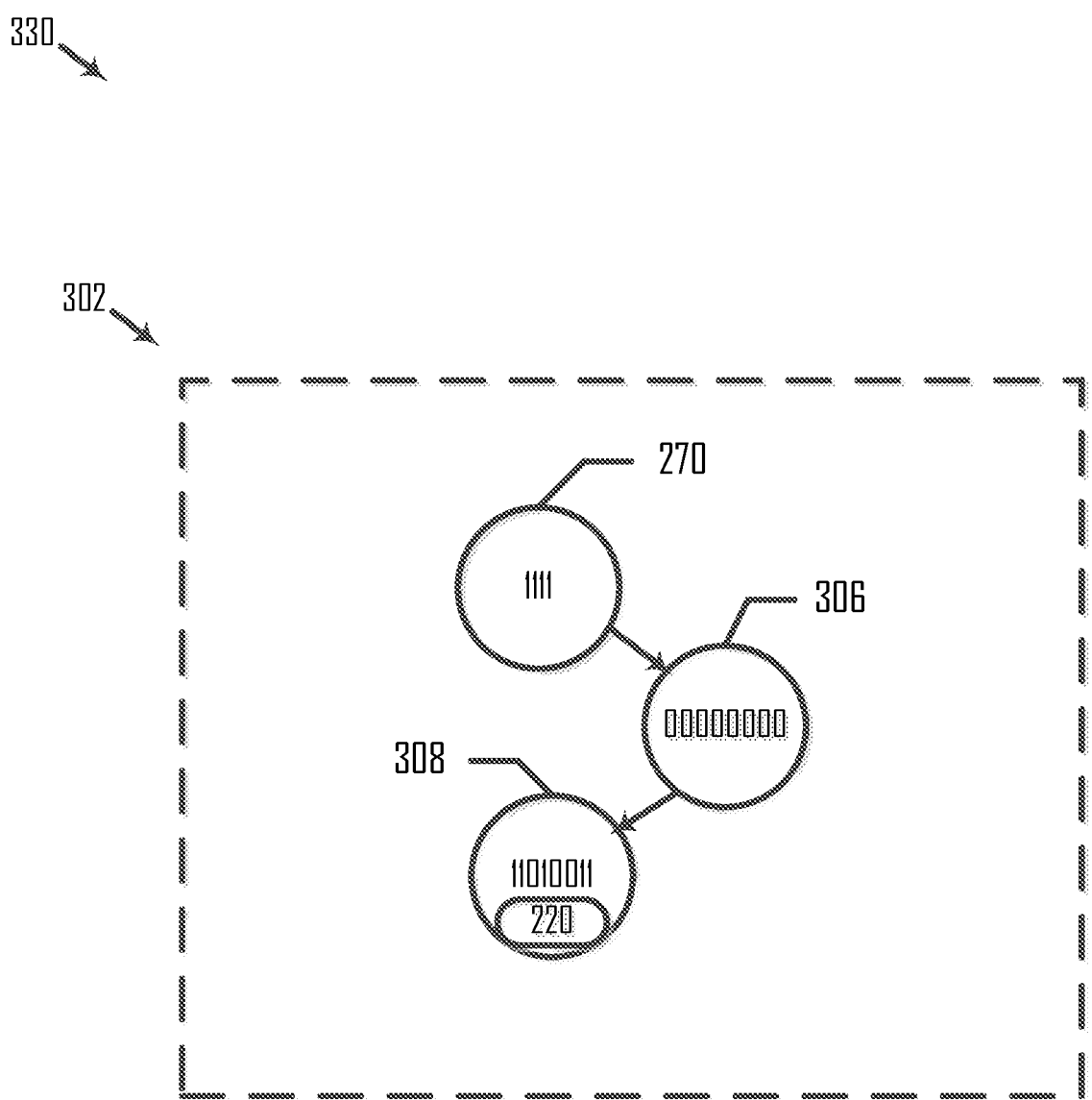

FIG. 3B-3C are diagrams of a key being removed from a radix tree, according to an embodiment. In an embodiment, remover 122 identifies a first set of containers in radix tree 302. The first set of containers stores key 302, and each container of the first set of containers includes a chunk of the sequence of elements included in key 202. If an identified container stores a value to which the key to be removed is mapped, remover 122 deletes the value. If an identified container references a value to which the key to be removed is mapped, remover 122 removes the reference.

Remover 122 removes key 202 from radix tree 302 by traversing the first set of containers. In an example, remover 122 traverses the first set of containers by starting from a last container having a deepest depth to a starting container having a smallest depth of the first set of containers. In another example, remover 122 traverses the first set of containers by starting from the starting container to the deepest container of the first set of containers. For each traversed container of the first set of containers, remover 122 determines whether the traversed container has a child container and when the traversed container is determined to not have a child container, remover 122 removes the traversed container from the radix tree.

In an example, in FIG. 3A, remover 122 may identify containers 270, 272, and 212 as included in the first set of containers in radix tree 302. Remover 122 may traverse containers 270, 272, and 212 by identifying container 212 as the last container of the first set of containers because container 212 has a deepest depth compared to the other containers in the first set of containers. Remover 122 determines that container 212 does not have a child container and thus removes container 212 from radix tree 302. Remover 122 traverses the first set of containers up to the starting container having a smallest depth of the first set of containers. For example, remover 122 then traverses container 212's parent container, which is container 272. Remover 122 determines that container 272 does not have a child container and thus removes container 272 from radix tree 302. Remover 122 then traverses container 272's parent container, which is container 270. Remover 122 determines that container 270 has a child container and thus does not remove child 270. FIG. 3B is a block diagram 320 illustrating radix tree 302 after key 202 has been removed, according to an embodiment. In FIG. 3B, radix tree 302 includes containers 270, 304, 306, and 308.

2. Combine One or More Containers in the Radix Tree

In an embodiment, combiner 124 identifies a second set of containers to combine into a single container. In an example, combiner 124 takes the chunks included in the second set of containers and places the chunks into a single container. Combiner 124 may combine the second set of containers in radix tree 302 into a single container. In an example, combiner 124 combines the second set of containers by identifying a given container including a first sequence of elements in radix tree 302 and determining whether the given container has only one child. In an example, combiner 124 identifies container 270 as the given container, and container 270 includes a chunk including a first sequence of elements "11". When container 270 is determined to have only one child, combiner 124 may determine whether a length of the first sequence of elements does not exceed a threshold. The threshold may be eight, and a length of the first sequence of elements "11" is two, which does not exceed eight.

Container 270 has a single child container 304, which includes a second sequence of elements "11". When container 270 is determined to have only one child and the length of the first sequence of elements is determined to not exceed the threshold, combiner 124 may combine container 270 and child container 304 into a single container and remove the child container 304. FIG. 3C is a block diagram 330 illustrating radix tree 302 after containers 270 and 304 in FIG. 3B have been combined, according to an embodiment. In an example, combiner 124 copies the second sequence of elements included in child container 304 into container 270 such that the single container includes the first and second sequence of elements. Combining the second set of containers into a single container in this fashion may provide a faster lookup of keys that are not stored in the radix tree because the containers closer to the root container store more elements that may or may not match a sequence of elements in a key being search for.

In an example, a length of the combined sequence of elements stored in the single container may exceed a threshold. If the length of the combined sequence of elements stored in the single container exceeds the threshold splitter 110 may split, based on the threshold, the combined sequence of elements into a plurality of chunks. Each chunk of the plurality may include a sequence of elements in the combined sequence of elements.

As discussed above and further emphasized here, FIGS. 1, 2A-2D, and 3A-3C are merely examples, which should not unduly limit the scope of the claims. For example, it should be understood that one or more modules may be combined with another module. It should also be understood that a module may be separated into more than one module.

Additionally, although the threshold was described as being satisfied if the length of a key exceeds the threshold, it should also be understood that embodiments in which the threshold is satisfied if the length of the key does not exceed the threshold is within the scope of the disclosure. For example, splitter 110 may determine to not split the key if the threshold is satisfied. Additionally, although the sequence of elements has been illustrated in FIGS. 2A-2D and 3A-3C as being bits, it should be understood that this not intended to be limiting. Other embodiments in which an element is different from a bit is within the scope of the disclosure. For example, the containers may include letters or other symbols.

III. Example Methods

Figure 4:
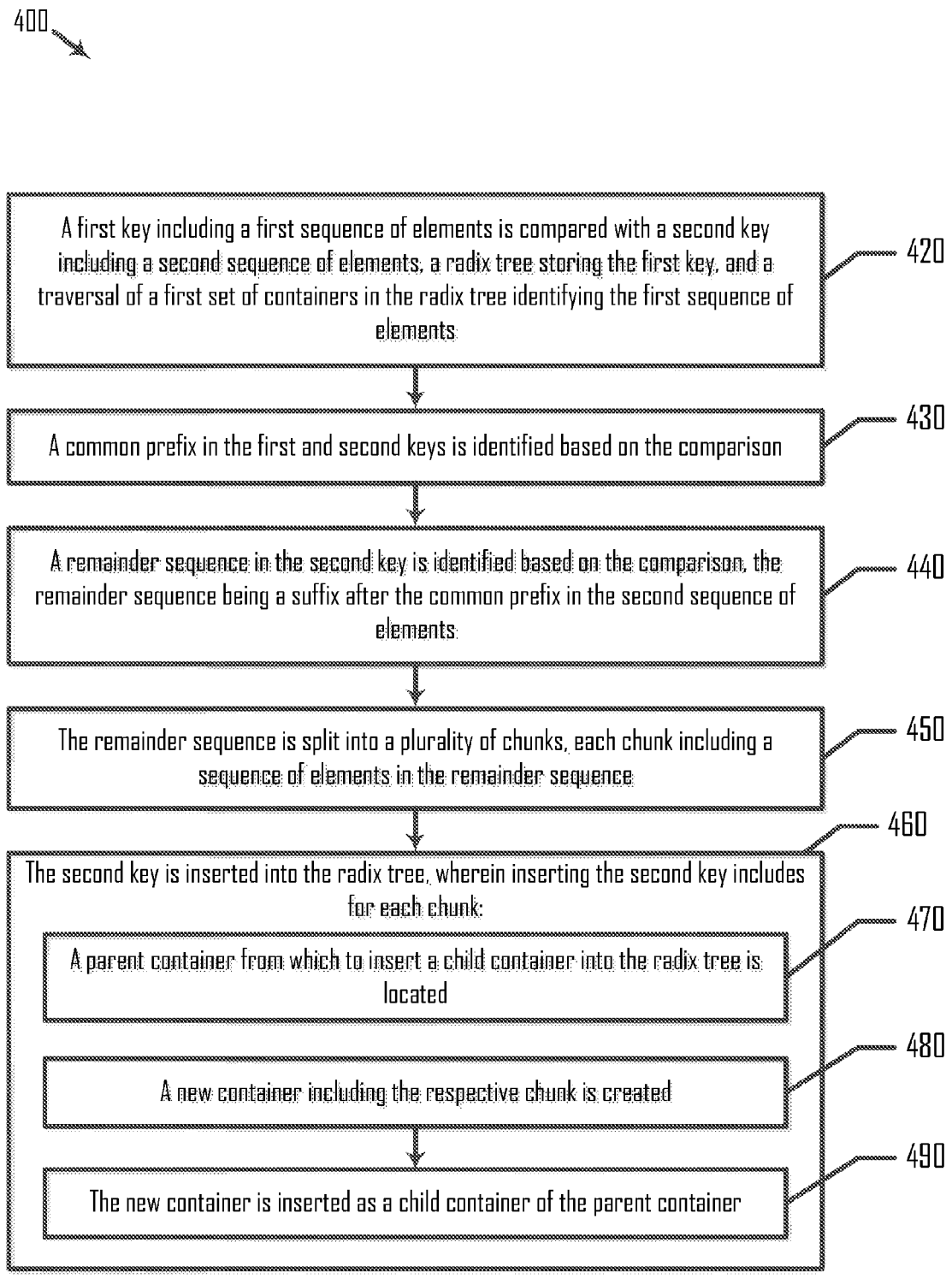
FIG. 4 is a flowchart illustrating a method of inserting a key into a radix tree, according to an embodiment.

FIG. 4 is a flowchart illustrating a method 400 of inserting a key into a radix tree, according to an embodiment. Method 400 is not meant to be limiting and may be used in other applications.

Method 400 includes actions 420-490. In an action 420, a first key including a first sequence of elements is compared with a second key including a second sequence of elements, a radix tree storing the first key, and a traversal of a first set of containers in the radix tree identifying the first sequence of elements. In an example, splitter 110 compares key 202 including a first sequence of elements with key 232 including a second sequence of elements, radix tree 220 storing key 202, and a traversal of a first set of containers in radix tree 220 identifying the first sequence of elements.

In an action 430, a common prefix in the first and second keys is identified based on the comparison. In an example, splitter 110 identifies, based on the comparison, a common prefix 246 in key 202 and key 232. In an action 440, a remainder sequence in the second key is identified based on the comparison, the remainder sequence being a suffix after the common prefix in the second sequence of elements. In an example, splitter 110 identifies, based on the comparison, a remainder sequence 248 in key 232, remainder sequence 248 being a suffix after common prefix 246 in the second sequence of elements. In an action 450, the remainder sequence is split into a plurality of chunks, each chunk including a sequence of elements in the remainder sequence. In an example, splitter 110 split remainder sequence 248 into a plurality of chunks, each chunk including a sequence of elements in remainder sequence 248.

In an action 460, the second key is inserted into the radix tree and includes actions 470-490. In an example, container inserter 114 inserts key 232 into radix tree 220. In an action 470, a parent container from which to insert a child container into the radix tree is located. In an example, container inserter 114 locates a parent container from which to insert a child container into radix tree 220. In an action 480, a new container including the respective chunk is created. In an example, container generator 112 creates a new container including the respective chunk. In an action 490, the new container is inserted as a child container of the parent container. In an example, container inserter 114 inserts the new container as a child container of the parent container.

It is also understood that additional processes may be performed before, during, or after actions 420-490 discussed above. In an example, method 500 may follow action 490. It is also understood that one or more of the actions of method 400 described herein may be omitted, combined, or performed in a different sequence as desired.

Figure 5:
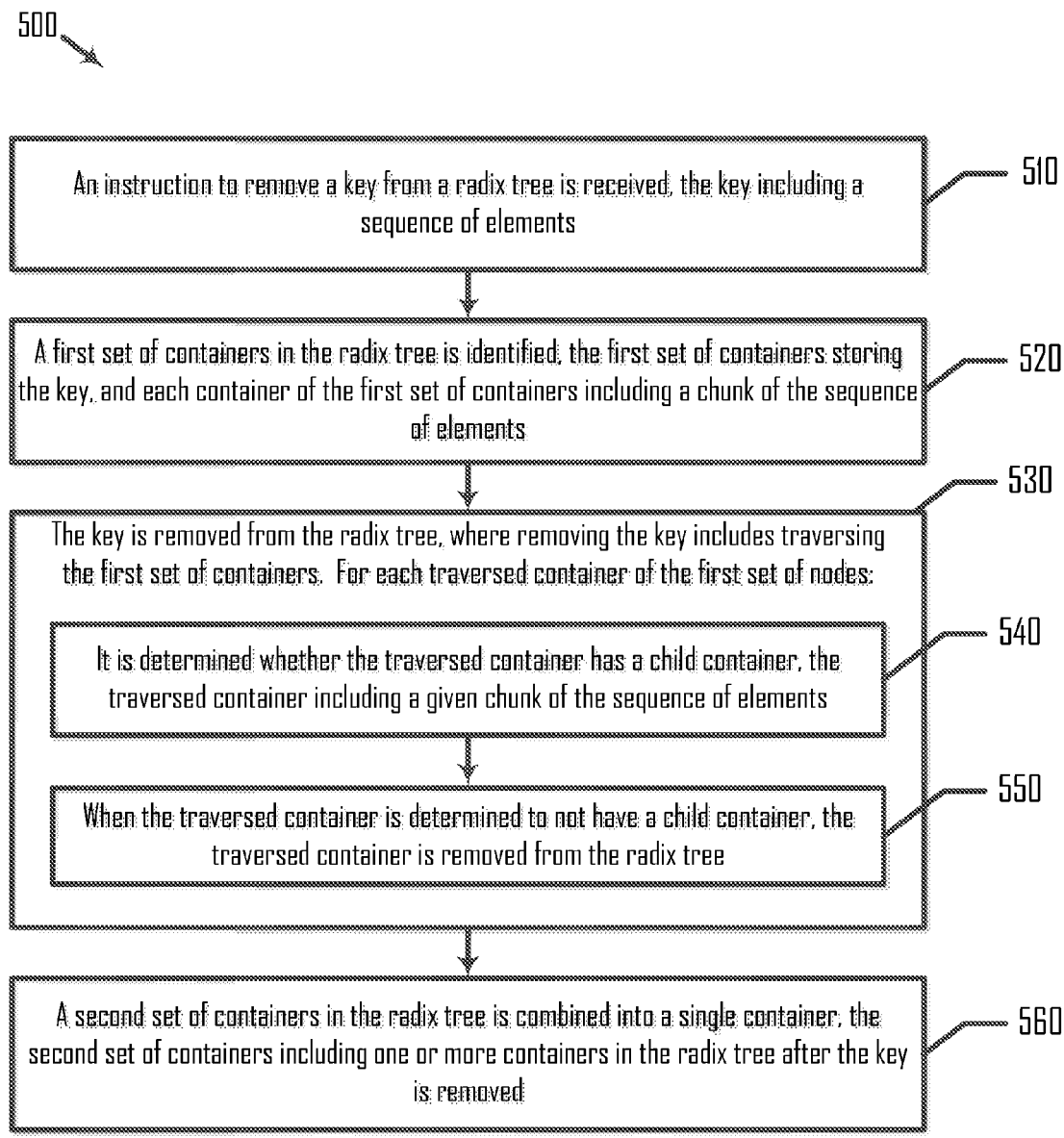
FIG. 5 is a flowchart illustrating a method of removing a key from a radix tree, according to an embodiment.

FIG. 5 is a flowchart illustrating a method 500 of removing a key from a radix tree, according to an embodiment. Method 500 is not meant to be limiting and may be used in other applications.

Method 500 includes actions 510-560. In an action 510, an instruction to remove a key from a radix tree is received, the key including a sequence of elements. In an example, key remover 108 receives an instruction to remove a key from a radix tree, the key including a sequence of elements.

In an action 520, a first set of containers in the radix tree is identified, the first set of containers storing the key, and each container of the first set of containers including a chunk of the sequence of elements. In an example, remover 122 identifies a first set of containers in radix tree 220, the first set of containers storing key 202, and each container of the first set of containers including a chunk of the sequence of elements. In an action 530, the key is removed from the radix tree and for each traversed container of the first set of containers, actions 540 and 550 are performed. In action 530, removing the key includes traversing the first set of containers. In an example, remover 122 removes key 202 from radix tree 302, where remover 122 removes key 202 by traversing containers 270, 272, and 212 from a last container 212 having a deepest depth to a starting container 270 having a smallest depth of the first set of containers.

In an action 540, it is determined whether the traversed container has a child container, the traversed container including a given chunk of the sequence of elements. In an example, remover 122 determines whether the traversed container has a child container, the traversed container including a given chunk of the sequence of elements. In an action 550, when the traversed container is determined to not have a child container, the traversed container is removed from the radix tree. In an example, when the traversed container is determined to not have a child container, remove 122 removes the traversed container from the radix tree.

In an action 560, a second set of containers in the radix tree is combined into a single container, the second set of containers including one or more containers in the radix tree after the key is removed. In an example, combiner 124 combines a second set of containers in the radix tree into a single container, the second set of containers including one or more containers in the radix tree after the key is removed.

It is also understood that additional processes may be performed before, during, or after actions 510-560 discussed above. In an example, method 400 may follow action 560. It is also understood that one or more of the actions of method 500 described herein may be omitted, combined, or performed in a different sequence as desired.

IV. Example Computing System

Figure 6:
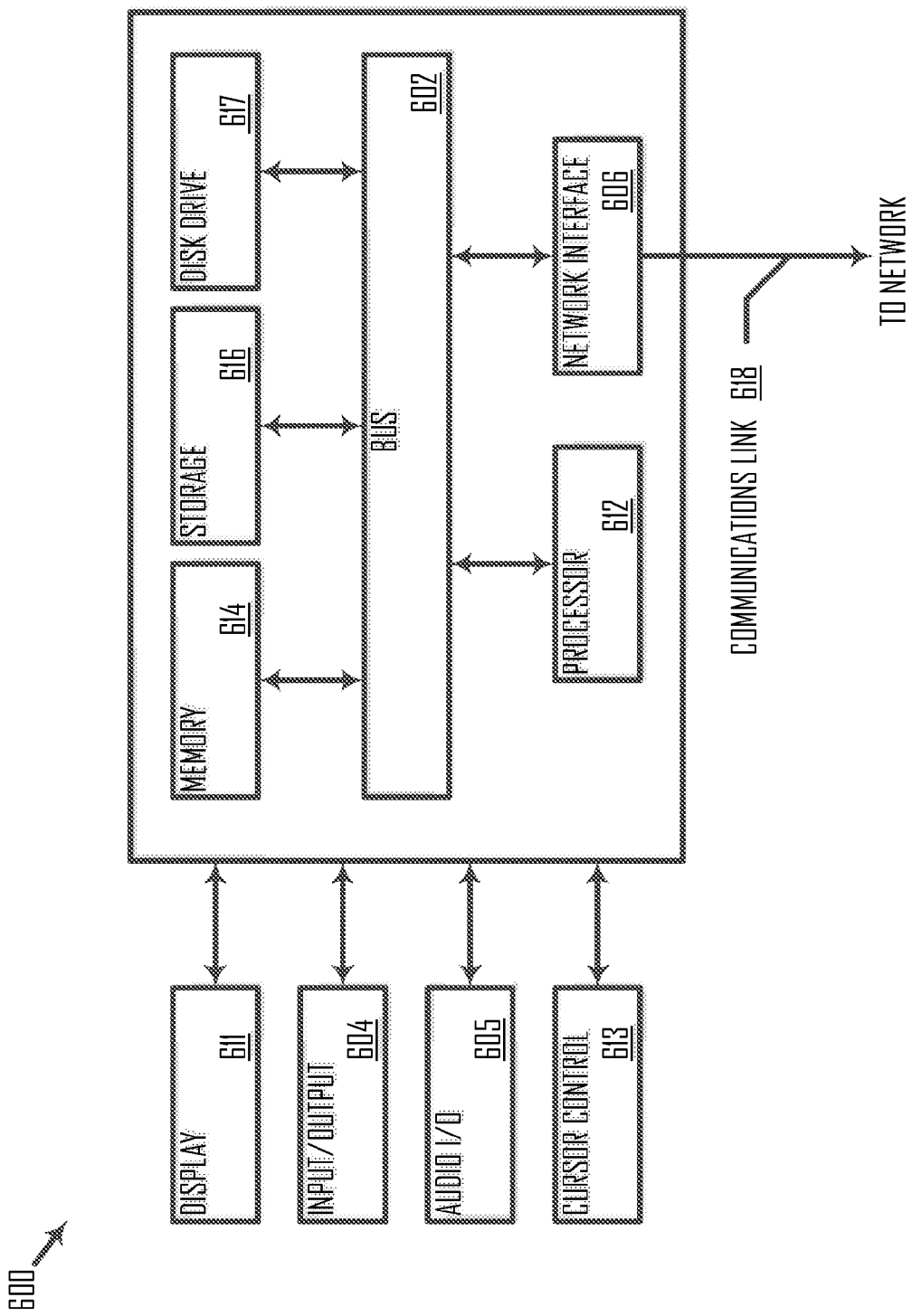
FIG. 6 is a block diagram of an electronic system suitable for implementing one or more embodiments of the present disclosure.

FIG. 6 is a block diagram of a computer system 600 suitable for implementing one or more embodiments of the present disclosure. In various implementations, computing device 102 may include a client or a server computing device that includes one or more processors and may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons or links, etc., and sends a corresponding signal to bus 602. I/O component 604 may also include an output component such as a display 611, and an input control such as a cursor control 613 (such as a keyboard, keypad, mouse, etc.). An optional audio input/output component 605 may also be included to allow a user to use voice for inputting information by converting audio signals into information signals. Audio I/O component 605 may allow the user to hear audio. A transceiver or network interface 606 transmits and receives signals between computer system 600 and other devices via a communication link 618 to a network. In an embodiment, the transmission is wireless, although other transmission mediums and methods may also be suitable. A processor 612, which may be a microcontroller, digital signal processor (DSP), or other processing component, processes these various signals, such as for display on computer system 600 or transmission to other devices via communication link 618. Processor 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor 612 and other components by executing one or more sequences of instructions contained in system memory component 614. Logic may be encoded in a computer readable medium, which may refer to any medium that participates in providing instructions to processor 612 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 614, and transmission media includes coaxial cables, copper wire, and fiber optics, including wires that include bus 602. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more specific purpose computers and/or computer systems, networked and/or otherwise. Where applicable, the ordering of various action described herein may be changed, combined into composite actions, and/or separated into sub-actions to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

I claim:

1. A method of inserting a key into a radix tree, comprising:
   comparing a first key including a first sequence of elements with a second key including a second sequence of elements, a radix tree storing the first key, and a first traversal of a first set of containers in the radix tree identifying the first sequence of elements;
   identifying, based on the comparing, a common prefix in the first and second keys;
   identifying, based on the comparing, a remainder sequence in the second key, the remainder sequence being a suffix after the common prefix in the second sequence of elements;
   splitting the remainder sequence into a plurality of chunks, each chunk including a sequence of elements in the remainder sequence; and
   inserting the second key into the radix tree, wherein the inserting the second key includes for each chunk:
      locating a parent container from which to insert a child container into the radix tree, the parent container including a first chunk of the second sequence of elements;
      creating a new container including the respective chunk; and
      inserting the new container as a child container of the parent container, wherein the respective chunk is the next sequence of elements after the first chunk in the second sequence of elements.

2. The method of claim 1, further including:
   identifying a value to which the key maps; and
   associating the value with a leaf container storing a chunk of the plurality of chunks.

3. The method of claim 1, wherein the splitting the remainder sequence includes identifying a threshold and splitting, based on the threshold, the remainder sequence, wherein a length of each chunk of the plurality of chunks does not exceed the threshold.

4. The method of claim 3, wherein the splitting includes:
   determining whether a length of the remainder sequence divides equally into the threshold; and
   when the length of the remainder sequence is determined to not divide equally into the threshold, determining a remainder based on dividing the length of the remainder sequence by the threshold, wherein a length of a beginning chunk of the plurality of chunks is equal to the remainder.

5. The method of claim 3, wherein the splitting includes:
   determining whether a length of the remainder sequence divides equally into the threshold; and
   when the length of the remainder sequence is determined to not divide equally into the threshold, determining a remainder based on dividing the length of the remainder sequence by the threshold, wherein a length of a last chunk of the plurality of chunks is equal to the remainder.

6. The method of claim 3, wherein the splitting includes:
   determining a remainder R based on dividing a length of the remainder sequence by the threshold; and
   determining a quotient based on dividing the length of the remainder sequence by the threshold,
   incrementing the quotient, wherein splitting the remainder sequence includes splitting the remainder sequence into R chunks and N chunks, the R chunks including the beginning R chunks in the remainder sequence, each of the R chunks having a length equal to the incremented quotient, each of the N chunks having a length equal to the quotient, and wherein R and N are whole numbers greater than or equal to zero.

7. The method of claim 3, wherein the splitting includes:
   determining a remainder R based on dividing a length of the remainder sequence by the threshold; and
   determining a quotient based on dividing the length of the remainder sequence by the threshold,
   incrementing the quotient, wherein splitting the remainder sequence includes splitting the remainder sequence into R chunks and N chunks, the R chunks including the last R chunks in the remainder sequence, each of the R chunks having a length equal to the incremented quotient, each of the N chunks having a length equal to the quotient, and wherein R and N are whole numbers greater than or equal to zero.

8. The method of claim 1, wherein a second traversal of the inserted containers in the radix tree identifies consecutive chunks included in the second key, and wherein each traversed container stores a subset of the second key.

9. The method of claim 1, further including:
   traversing the radix tree;
   identifying, based on the traversing, a particular parent container including a third sequence of elements, the third sequence of elements including the common prefix;
   splitting the third sequence of elements into a second plurality of chunks, the second plurality of chunks including a prefix chunk and a second remainder sequence, the prefix chunk including the common prefix;

determining whether to split the second remainder sequence into a third plurality of chunks;
when it is determined to split the second remainder sequence into the third plurality of chunks, splitting the second remainder sequence into the third plurality of chunks;
for each chunk of the second and third plurality of chunks, creating a container including the respective chunk, wherein the creating a container includes creating a prefix container that includes the common prefix; and
replacing the particular parent container with the one or more container created based on the second and third plurality of chunks.

10. The method of claim 7, wherein the replacing includes:
locating the prefix container including the prefix chunk;
identifying a next container in the second and third plurality of chunks, the next container including a chunk that is after the prefix chunk based on an order of the third sequence of elements; and
inserting the next container as a child of the parent container.

11. The method of claim 1, further including:
receiving an instruction to remove a third key from the radix tree, the third key including a third sequence of elements;
identifying a second set of containers in the radix tree, the second set of containers storing the third key, and each container of the second set of containers including a chunk of the third sequence of elements;
removing the third key from the radix tree, wherein the removing includes traversing the second set of containers, and for each traversed container of the second set of containers, the method further includes:
determining whether the traversed container has a child container; and
when the traversed container is determined to not have a child container, removing the traversed container from the radix tree; and
combining a third set of containers in the radix tree into a single container, the third set of containers including one or more containers in the radix tree after the third key is removed.

12. The method of claim 11, further including:
identifying the combined sequence of elements stored in the single container; and
splitting, based on a threshold, the combined sequence of elements into a second plurality of chunks, each chunk of the second plurality including a sequence of elements in the combined sequence of elements.

13. The method of claim 1, wherein a container is a node or an edge in the radix tree.

14. A system for inserting a key into a radix tree, comprising:
a splitter that compares a first key including a first sequence of elements with a second key including a second sequence of elements, identifies a common prefix in the first and second keys, identifying a remainder sequence in the second key, and splits the remainder sequence into a plurality of chunks, wherein the first key is stored in a radix tree and a traversal of a first set of containers in the radix tree identifies the first sequence of elements, wherein the remainder sequence is a suffix after the common prefix in the second sequence of elements, and wherein each chunk includes a sequence of elements in the remainder sequence;
a container generator that for each chunk of the plurality of chunks creates a container including the respective chunk; and
a container inserter that inserts the second key into the radix tree, wherein for each chunk the container inserter locates a parent container from which to insert a child container into the radix tree and inserts the container including the respective chunk as a child container of the parent container, wherein the parent container includes a first chunk of the second sequence of elements, and the respective chunk is the next sequence of elements after the first chunk in the second sequence of elements.

15. The system of claim 14, wherein the splitter identifies a threshold and splits, based on the threshold, the remainder sequence, and wherein a length of each chunk of the plurality of chunks does not exceed the threshold.

16. The system of claim 15, wherein the splitter determines whether a length of the remainder sequence divides equally into the threshold, wherein when the splitter determines that the length of the remainder sequence does not divide equally into the threshold, the splitter determines a remainder based on dividing the length of the remainder sequence by the threshold, and wherein a length of a beginning chunk of the plurality of chunks is equal to the remainder.

17. The system of claim 15, wherein the splitter determines whether a length of the remainder sequence divides equally into the threshold, and when the length of the remainder sequence is determined to not divide equally into the threshold, the splitter determines a remainder based on dividing the length of the remainder sequence by the threshold, and wherein a length of a last chunk of the plurality of chunks is equal to the remainder.

18. The system of claim 15, wherein the splitter determines a remainder R based on dividing a length of the remainder sequence by the threshold, determines a quotient based on dividing the length of the remainder sequence by the threshold, and increments the quotient, wherein the splitter splits the remainder sequence into R chunks and N chunks, wherein the R chunks includes the beginning R chunks in the remainder sequence, each of the R chunks has a length equal to the incremented quotient, each of the N chunks has a length equal to the quotient, and wherein R and N are whole numbers greater than or equal to zero.

19. The system of claim 15, wherein the splitter determines a remainder R based on dividing a length of the remainder sequence by the threshold, determines a quotient based on dividing the length of the remainder sequence by the threshold, and increments the quotient, wherein the splitter splits the remainder sequence into R chunks and N chunks, wherein the R chunks includes the last R chunks in the remainder sequence, each of the R chunks has a length equal to the incremented quotient, each of the N chunks has a length equal to the quotient, and wherein R and N are whole numbers greater than or equal to zero.

20. The system of claim 14, further including:
a traverser that traverses the radix tree and identifies a particular parent container including a third sequence of elements, wherein the third sequence of elements includes the common prefix,
wherein the splitter splits the third sequence of elements into a second plurality of chunks including a prefix chunk and a second remainder sequence, the prefix chunk including the common prefix, wherein the splitter determines whether to split the second remainder sequence into a third plurality of chunks and when the splitter determines to split the second remainder sequence into the third plurality of chunks, the splitter splits the second remainder sequence into the third plurality of chunks, wherein for each chunk of the second and third plurality of chunks, the container generator creates a container including the respective chunk, wherein the container generator creates a prefix container that includes the common prefix, and wherein the container inserter replaces the particular parent container with the one or more containers created based on the second and third plurality of chunks.

21. The system of claim 20, wherein the container inserter locates the prefix container including the prefix chunk, identifies a next container in the second and third plurality of chunks, and inserts the next container as a child of the parent container, wherein the next container includes a chunk that is after the prefix chunk based on an order of the third sequence of elements.

22. The system of claim 10, further including:
a remover that receives an instruction to remove a third key including a third sequence of elements from the radix tree, that identifies a second set of containers in the radix tree, and removes the third key from the radix tree, wherein the second set of containers stores the third key, and each container of the second set of containers includes a chunk of the third sequence of elements;

a traverser that traverses the second set of containers, wherein for each traversed container of the second set of containers, the remover determines whether the traversed container has a child container and when the traversed container is determined to not have a child container, the remover removes the traversed container from the radix tree; and a combiner that combines a third set of containers in the radix tree into a single container, wherein the third set of containers includes one or more containers in the radix tree after the third key is removed.

23. The system of claim 22, wherein the splitter identifies the combined sequence of elements stored in the single container and splits, based on a threshold, the combined sequence of elements into a second plurality of chunks, wherein each chunk of the second plurality includes a sequence of elements in the combined sequence of elements.

24. A machine-readable medium comprising a plurality of machine-readable instructions that when executed by one or more processors is adapted to cause the one or more processors to perform a method comprising:
comparing a first key including a first sequence of elements with a second key including a second sequence of elements, a radix tree storing the first key, and a traversal of a first set of containers in the radix tree identifying the first sequence of elements;
identifying, based on the comparing, a common prefix in the first and second keys;
identifying, based on the comparing, a remainder sequence in the second key, the remainder sequence being a suffix after the common prefix in the second sequence of elements;
splitting the remainder sequence into a plurality of chunks, each chunk including a sequence of elements in the remainder sequence; and
inserting the second key into the radix tree, wherein the inserting the second key includes for each chunk:
locating a parent container from which to insert a child container into the radix tree, the parent container including a first chunk of the second sequence of elements;
creating a new container including the respective chunk; and
inserting the new container as a child container of the parent container, the respective chunk being the next sequence of elements after the first chunk in the second sequence of elements.

25. A method of removing a key from a radix tree, comprising:
receiving an instruction to remove a key from a radix tree, the key including a sequence of elements;
identifying a first set of containers in the radix tree, the first set of containers storing the key, and each container of the first set of container including a chunk of the sequence of elements;
removing the key from the radix tree, wherein the removing includes traversing the first set of containers, wherein a parent container of the first set of containers stores a first chunk of the key and a child container of the first set of containers stores a second chunk after the first chunk in the sequence of elements, and for each traversed container of the first set of containers, the method further includes:
determining whether the traversed container has a child; and
when the traversed container is determined to not have a child, removing the traversed container from the radix tree; and
combining a second set of containers in the radix tree into a single container, the second set of containers including one or more containers in the radix tree after the removing the key.

26. The method of claim 25, wherein the combining includes:
identifying a given container including a second sequence of elements in the radix tree;
determining whether the given container has only one child;
when the given container is determined to have only one child, determining whether a length of the second sequence of elements does not exceed a threshold; and
when the given container is determined to have only one child and the length of the second sequence of elements is determined to not exceed the threshold, combining the given container and the child container of the given container into a single container.

27. The method of claim 26, wherein the child container of the given container includes a third sequence of elements, and wherein the combining includes:
copying the third sequence of elements into the given container, wherein the single container includes the second and third sequences of elements; and
removing the child container of the given container.

28. The method of claim 25, further including:
receiving an instruction to insert a second key into the radix tree, the second key including a second sequence of elements;
comparing the second key with a third key including a third sequence of elements;
identifying, based on the comparing, a common prefix in the second and third keys;

identifying, based on the comparing, a remainder sequence in the third key, the remainder sequence being a suffix after the common prefix in the third sequence of elements;
splitting the remainder sequence into a plurality of chunks, each chunk including a sequence of elements in the remainder sequence; and
inserting the third key into the radix tree, wherein the inserting includes for each chunk:
locating a particular parent container from which to insert a child into the radix tree;
creating a new container including the respective chunk; and
inserting the new container as a child of the particular parent container.

29. The method of claim 25, further including:
identifying the combined sequence of elements stored in the single container; and
splitting, based on a threshold, the combined sequence of elements into a plurality of chunks, each chunk of the plurality including a sequence of elements in the combined sequence of elements.

30. A system for removing a key from a radix tree including one or more containers, comprising:
a remover that receives an instruction to remove a key from a radix tree, identifies a first set of containers in the radix tree, and removes the key from the radix tree, wherein the key includes a sequence of elements, the first set of containers stores the key, and each container of the first set of containers includes a chunk of the sequence of elements;
a traverser that traverses the first set of containers, wherein a parent container of the first set of containers stores a first chunk of the key and a child container of the first set of containers stores a second chunk after the first chunk in the sequence of elements, wherein for each traversed container of the first set of containers the remover determines whether the traversed container has a child and when the traversed container is determined to not have a child, the remover removes the traversed container from the radix tree; and
a combiner that combines a second set of containers in the radix tree into a single container, wherein the second set of containers includes one or more containers in the radix tree after the remover removes the key.

31. The system of claim 30, wherein the combiner identifies a given container including a second sequence of elements in the radix tree and determines whether the given container has only one child, wherein when the given container is determined to have only one child, the combiner determines whether a length of the second sequence of elements does not exceed a threshold, wherein when the given container is determined to have only one child and the length of the second sequence of elements is determined to not exceed the threshold, the combiner combines the given container and the child container of the given container into a single container.

32. The system of claim 31, wherein the child container of the given container includes a third sequence of elements, and wherein the combiner copies the third sequence of elements into the given container and removes the child container of the given container, and wherein the single container includes the second and third sequences of elements.

33. The system of claim 30, further including:
a splitter that receives an instruction to insert a second key including a second sequence of elements into the radix tree, wherein the splitter compares the second key with a third key including a third sequence of elements, identifies, based on the comparison, a common prefix in the second and third keys, identifies, based on the comparison, a remainder sequence in the third key, and splits the remainder sequence into a plurality of chunks, wherein the remainder sequence is a suffix after the common prefix in the third sequence of elements, and each chunk includes a sequence of elements in the remainder sequence;
a container generator that for each chunk of the plurality of chunks creates a container including the respective chunk; and
a container inserter that inserts the third key into the radix tree, wherein for each chunk the container inserter locates a particular parent container from which to insert a child into the radix tree, creates a new container including the respective chunk, and inserts the new container as a child of the parent container.

34. The system of claim 30, wherein the splitter identifies the combined sequence of elements stored in the single container and splits, based on a threshold, the combined sequence of elements into a plurality of chunks, wherein each chunk of the plurality includes a sequence of elements in the combined sequence of elements.

35. A machine-readable medium comprising a plurality of machine-readable instructions that when executed by one or more processors is adapted to cause the one or more processors to perform a method comprising:
receiving an instruction to remove a key from a radix tree, the key including a sequence of elements;
identifying a first set of containers in the radix tree, the first set of containers storing the key, and each container of the first set of container including a chunk of the sequence of elements;
removing the key from the radix tree, wherein the removing includes traversing the first set of containers, wherein a parent container of the first set of containers stores a first chunk of the key and a child container of the first set of containers stores a second chunk after the first chunk in the sequence of elements, and for each traversed container of the first set of containers, the method further includes:
determining whether the traversed container has a child; and
when the traversed container is determined to not have a child, removing the traversed container from the radix tree; and
combining a second set of containers in the radix tree into a single container, the second set of containers including one or more containers in the radix tree after the removing the key.

* * * * *